3,260,710
LUBRICANT ADDITIVES COMPRISING COPOLYMERS OF ALKENES WITH ACETALS OR KETALS
Cecil G. Brannen, Highland, and James A. Wuellner, Gary, Ind., assignors to Standard Oil Company, Chicago, Ill., a corporation of Indiana
No Drawing. Filed June 28, 1962, Ser. No. 205,863
6 Claims. (Cl. 260—88.1)

This invention relates to novel copolymeric compositions. The invention also concerns a copolymer composition having pendant radicals suitable for attaching thereto functional groups for imparting to the copolymer useful properties. More specifically, the invention concerns multi-purpose lubricant compositions consisting of a major amount of a base lubricant and a minor amount of a copolymer of a terminally unsaturated alkene monomer and an acetal, ketal or ketene acetal monomer.

It is well known that copolymers produced by conventional polymerization techniques contain monomeric units which alternate regularly or at random in the copolymer chain. The properties of the copolymer will depend upon the particular monomers employed, and the relative concentrations of each monomer in the copolymer product. Thus, by judiciously selecting the monomers to be copolymerized, and by controlling their relative concentrations, copolymers having specific useful properties may be tailor-made to fit the needs of industry. In particular, copolymeric compositions useful as lubricants and lubricant additives may be manufactured.

Lubricating oils perform more effectively when chemical additives are combined with the lubricating oil. Among the more important properties of a lubricant ameliorated by additives, such as polymers and copolymers, is the viscosity index. An improved viscosity index results in a more uniform viscosity at the varying temperatures to which a lubricant is often subjected during use. Thus, a particularly advantageous means of improving the viscosity index of a lubricant is by adding to a base lubricant an oil-soluble copolymer, such as the copolymeric compositions of the present invention.

In recent years lubricant manufacturers have directed their efforts toward multi-purpose lubricant compositions. A composition which performs multi-functions, such as improving the viscosity index, imparting detergency characteristics and rust inhibition reduces the number of additives required in a lubricant, and often proportionately reduces the cost without sacrificing quality. It is an object of this invention to provide a novel copolymeric composition having pendant aryloxy and/or alkoxy radicals for attaching thereto functional groups capable of imparting to the copolymer useful properties, such as detergency, anti-rust properties and anti-oxidation properties. Another object is a copolymer composition suitable for improving the viscosity index of a lubricant when minor amounts of the copolymer are added to the lubricant. A further object is to provide a copolymeric composition of a terminally unsaturated alkene monomer and an acetal, ketal or ketene acetal monomer. A more specific object is to provide a lubricant composition containing a base lubricant and a minor amount of the copolymer of this invention.

Copolymers of the present invention are copolymerization products of a terminally unsaturated alkene monomer and an acetal, ketal or ketene acetal monomer which copolymer has one of the following general formulas:

(I) 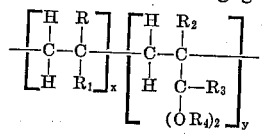

(II) 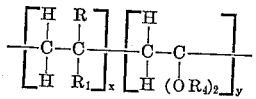

wherein R is hydrogen or methyl; $R_1$ is hydrogen or $C_{1-17}$ alkyl; $R_2$ is hydrogen or methyl; $R_3$ is hydrogen, alkyl or aryl; and $R_4$ is alkyl or aryl. The ratio of $x$ to $y$ may be from about 200:1 to 25:1, and preferably is about 50:1.

For copolymerization of the alkene and acetal, ketal or ketene acetal monomers to occur, it is believed the alkene monomer must contain terminal unsaturation. Terminally unsaturated olefinic hydrocarbons may suitably be used. Advantageously, mono-olefinic hydrocarbons containing terminal unsaturation are employed. Isobutylene (2-methyl propene) is a preferred monomer. However, alkenes such as ethene, propene, butene-1, pentene-1, and hexene-1 may be employed. The number of carbon atoms in the chain of the alkene monomer having the formula

wherein R is hydrogen or methyl and $R_1$ is hydrogen or $C_{1-17}$ alkyl, may vary and alkenes containing from about 2 to 20 carbon atoms may suitably be employed.

The alkene monomer is copolymerized with an acetal, ketal or ketene acetal monomer, which shall hereafter be referred to generically as an acetal. The acetal monomer should possess an activated double bond and conform to one of the following general formulas:

(III) 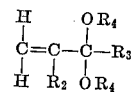

or (IV) 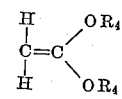

wherein $R_2$ is hydrogen or methyl; $R_3$ is hydrogen, alkyl or aryl; and $R_4$ is alkyl or aryl. Preferred acetal monomers are diethyl acetal of acrolein, diethyl ketal of vinylethyl ketone, and diethyl acetal of ketene (1,1-diethoxyethylene). Other acetal monomers which may advantageously be employed are diethyl acetal of methacrolein, dimethyl acetal of acrolein, dipropyl acetal of acrolein, dibutyl acetal of acrolein, diethyl ketal of vinylbutyl ketone, dibutyl ketal of vinylethyl ketone, dibutyl ketal of vinylbutyl ketone, diethyl ketal of vinylphenyl ketone, dibutyl ketal of vinylphenyl ketone, dibutyl acetal of ketene, and diphenyl acetal of ketene.

A preferred copolymer composition is produced by copolymerizing isobutylene and diethyl acetal of acrolein or isobutylene and diethyl acetal of ketene.

The ratio of alkene monomer to acetal monomer is of particular importance to the invention. Copolymerization of an alkene with an acetal changes the solubility properties of the acetal monomer. Thus, for the copolymer per se to be utilized as a lubricant, it is desirable that the ratio of alkene monomer to acetal monomer be high, preferably above about 50:1. When using the copolymer product of this invention as a lubricant additive, the ratio of alkene monomers to acetal monomers must be sufficiently high to produce an oil-soluble copolymer composition. A copolymer having about 25 alkene monomers for each acetal monomer may be used. However, a copolymer having above about 50 alkene monomers for each acetal monomer is preferred as a lubricant additive.

Polymerization techniques for polymerizing alkene monomers and acetal monomers are known in the art. Cation lymerization techniques employing a Lewis acid are preferred. Ziegler-type catalysts may also be advantageously employed. Typical Lewis acid catalysts suitable for copolymerizing copolymers of the present invention are boron fluoride etherate, aluminum chloride, titanium chloride. An example of a suitable Ziegler catalyst is alkyl aluminum and titanium chloride.

Polymerization may be effected in bulk or solution, and a preferred method is solution polymerization. A typical solvent is heptane; however, most inert hydrocarbon solvents are suitable. A useful expedient is to employ a base lubricating oil as a solvent. Subsequent separation of the copolymer product from a solvent which would be incompatible with the base oil is thus avoided.

In copolymerizing the alkene monomer with the acetal monomer about 0.1 to about 10 mole percent and preferably about 1.0 to 5.0 mole percent of the acetal monomer is employed. About 99.9 to 90 mole percent of the alkene monomer is thus desirably used. From about 1 to 20 weight percent of the above catalyst may suitably be used in polymerization.

Polymerization may be carried out at temperatures from about −100° F. to about +20° F. The molecular weight of the copolymer product is influenced by the polymerization temperature. Thus, the most advantageous polymerization temperature within the range will depend upon the desired molecular weight of the final product. A preferred temperature range for producing copolymers suitable for use as lubricant additives is about −50° F. to about −20° F. Polymerization may be accomplished at atmospheric, sub-atmospheric or super-atmospheric pressures. The pressure at which polymerization is carried out is not critical and persons familiar with cation polymerization techniques will know the desirable pressures for effecting polymerization.

After polymerization has been carried out for a time sufficient to copolymerize the alkene monomers and acetal monomers, the copolymer product may be separated from the reaction mixture and purified in the following manner. The reaction mixture is admixed with methanol, ethanol, propanol or another non-solvent and the copolymer is collected. The copolymer is then redissolved in hexane or an appropriate solvent and again precipitated with methanol. The resulting composition is an alkene acetal copolymer having a molecular weight from about 2,000 to about 120,000 depending largely on the polymerization temperature and the ratio of alkene to acetal monomers. Preferred copolymers will have a molecular weight from about 20,000 to about 80,000.

A distinctly novel feature of the copolymers of the present invention is the pendant similar or dissimilar alkoxy or aryloxy groups extending from the hydrocarbon backbone of the copolymer. These chemically reactive groups permit the addition of functional groups to the backbone copolymer to form copolymer derivatives having multi-functional properties. For example, the viscosity index improving copolymer may be reacted with functional groups to produce a derivative copolymer having detergency characteristics, rust-inhibiting properties and anti-oxidation properties in addition to its viscosity index improving characteristics. For example, a copolymer of isobutylene and diethylacetal of acrolein may be hydrolyzed, with an acid such as sulfuric acid, to a polyaldehyde containing pendant aldehyde groups. Similar hydrolysis of a copolymer of isobutylene and diethyl ketal of vinylethyl ketone will result in a polyketone, which has pendant ketone groups. Acid hydrolysis of a copolymer of isobutylene and diethoxyethylene will produce a hydrocarbon backbone polymer having pendant aldehyde, ketone and oxo groups. From the pendant aldehyde, ketone and oxo groups, numerous functional derivatives of the copolymer, such as oximes, hydrazones, alcohols, amines, alkanol amines and Schiff bases can be produced.

By reacting the acid hydrolyzed copolymers of this invention with hydroxylamine, oximes are produced. From the oximes a copolymer having pendant primary amine groups may be produced by reacting the oximes with sodium and alcohol, or by other well-known reactions. The primary amine may then be converted to a secondary or tertiary amine, by replacement of the hydrogen atoms with radicals, such as ethyl, propyl, pentyl, diethyl, dipropyl, methylethyl, ethylpentyl, ethylphenyl, pentylphenyl, or a diphenyl. Secondary and tertiary amines are formed from the primary amine by alkylating the primary amine with an alkyl halide. In particular, the secondary amine is formed by reacting the primary amine with aluminum alkoxides at 250°–350° in a closed chamber. The amine may be reacted with ethylene oxide to form ethanolamine and diethanolamine.

The carbonyl group of the pendant aldehyde or ketone may be reacted with hydrazines to form hydrazones. For example, an alkyl hydrazine, dialkyl hydrazine, aryl hydrazine, diaryl hydrazine or arylalkyl hydrazine may be reacted with the pendant carbonyl group of the copolymer to form derivatives, such as ethyl hydrazone, pentyl hydrazone, octyl hydrazone, diethyl hydrazone, dibutyl hydrazone, dinonyl hydrazone, phenyl hydrazone, diphenyl hydrazone or phenylethyl hydrazone. In a like manner the pendant carbonyl group may be reacted with semicarbazides to form semicarbazones, such as ethyl semicarbazone, propyl semicarbazone, heptyl semicarbazone, diethyl semicarbazone, ethyl hexyl semicarbazone, phenyl semicarbazone, diphenyl semicarbazone, ethylphenyl semicarbazone or decylphenyl semicarbazone. The acid-hydrolyzed copolymer and a primary amine may be catalytically hydrogenated to form N-alkylarylamines, alkylamines, arylamines, substituted alkylamines or substituted arylamines. For example, amines, such as aniline, phenylethylamine, ethylphenylamine, diphenylamine, diethylamine, butyldecylamine, and N-n-amylaniline may be used.

Another group of copolymer compositions containing pendant functional groups may be made by reducing the aldehyde or acetal groups to the alcohol. Reduction may be accomplished by reacting the isobutylene acetal, ketal or ketene acetal copolymer with zinc and hydrochloric acid, with sodium and alcohol or other well-known reducing agents, such as lithium aluminum hydride. The resulting pendant alcohol groups will be primary or secondary depending on whether an acetal or ketal is reduced. From the alcohol may be derived esters through reactions, such as the Fischer esterification. Pendant ester groups, such as alkyl, substituted alkyl, aryl and substituted aryl may be formed. Specific examples of the classes of esters which may be formed are the ethyl, pentyl, dodecyl and phenyl. By esterifying the alcohol group with an amino acid, such as glycine, alanine, valine, phenylalanine, proline, serine, methionine and histidine nitrogen containing pendant ester groups are formed.

By oxidizing the pendant aldehyde or acetal group a carboxylic acid is formed. Oxidizing agents, such as potassium permanganate, acetyl peroxide or air and a heavy metal catalyst, will accomplish the oxidation. From the carboxylic acids, acyl halides, such as the chloride, bromide or iodide may be formed by reacting the acid with the phosphorus trihalide, phosphorus pentahalide or thionyl halide. From the acid, esters may be prepared by well-known methods, such as the Fischer esterification. Examples of esters groups which may be formed by esterifying the acid are dimethyl aminoethanol, diethyl aminoethanol and dodecyl aminoethanol. The acids may be converted to amides by reacting the acid with aqueous ammonia to form amide derivatives. Specific amides may be formed by reacting the carboxylic acid with amines, such as tetraethylene pentamine and triethylene tetramine to form the amide of tetraethylene pentamine and triethylene tetramine.

The herein described copolymers may be used in a base lubricating oil in amounts varying from about .01 weight percent to about 10 weight percent. Advantageously, the copolymer is added to the base lubricant in concentrations from about .1 weight percent to about 5 weight percent. A preferred lubricating composition is obtained when a copolymer having a molecular weight of about 20,000 to about 80,000 is added to a hydrocarbon oil in concentrations of about .1 weight percent to about 5 weight percent.

A utility of the copolymers of the present invention is illustrated through the copolymer's use in a mineral lubricating oil to improve the viscosity index. However, the base oil to which the copolymer may be added is not limited to a mineral oil; synthetic and natural lubricating oils may also be employed as base lubricants.

The following are examples of the preparation of the basic copolymer composition of the present invention.

Example I

To prepare a copolymer of isobutylene and diethyl acetal of acrolein a mixture of 10 to 1 isobutylene to diethyl acetal of acrolein is mixed with twice its volume of heptane. Boron fluoride etherate is added incrementally over a period of about 30 minutes, and the mixture is stirred and maintained at a temperature of −30° F. After the mixture has stirred for about one hour, it is poured into methanol. The insoluble copolymer is collected and redissolved in hexane and again precipitated with methanol. The resulting copolymer is of low molecular weight, having an intrinsic viscosity of .05 to .1 at 20° C. in toluene. When examined, the infra-red spectra shows a strong absorption for acetal and polyisobutylene.

Example II

A copolymer of isobutylene and the diethyl ketal of isopropenyl methyl ketone is prepared as follows: A mixture of 62 g. (1.1 moles) of isobutylene and 17.5 g. (0.12 mole) of the ketal are externally cooled to −40° F. in a flask equipped with a stirrer and a thermometer. Boron fluoride gas is bubbled through the mixture, and the mixture is stirred at a rate sufficient to keep the temperature between −40° F. and −20° F. After about 4 minutes the mixture becomes very viscous. To stop the reaction the mixture is poured into methanol. The purification steps outlined in Example I may then be carried out. Conversion to a copolymer of isobutylene and diethyl ketal of isopropenyl methyl ketone is about 30 percent of the total reactants. The resulting copolymer has a molecular weight of about 50,000.

Example III

Isobutylene and 1,1 diethoxyethylene are copolymerized to form a copolymer of isobutylene and diethyl acetal of ketene. A mixture of 84 g. (1.5 moles) of isobutylene and 18.0 g. (0.15 mol) of 1,1-diethoxyethylene are externally cooled and stirred in a flask maintained at −60° F. Boron fluoride gas is added and the mixture stirred. The reaction temperature is maintained at between −60° F. and −20° F. by varying the flow of boron fluoride and stirring the reactants. After several minutes the reaction mixture becomes viscous, and the reaction is terminated by pouring the mixture into a flask of methanol. Purification procedures outlined in Example I may be carried out if desired. The precipitated copolymer is then collected. An examination of the copolymer indicates the molecular weight to be about 80,000 and the conversion to be about 20 percent of the charge.

A copolymer of the present invention having an average molecular weight of 90,000 is added to a 50–50 mixture of 5W–10W base mineral lubricating oil and a significant improvement in the viscosity index of the base oil results. The copolymer may be an isobutylene acetal, ketal, or ketene acetal copolymer. The following improvement in viscosity index of the base lubricating oil results.

| | SSU | | Viscosity Index |
|---|---|---|---|
| | 100° F. | 210° F. | |
| Base oil | 125 | 42 | 6 |
| Base oil plus weight percent copolymer: | | | |
| 0.5% | 155 | 44.5 | 11 |
| 1.0% | 180 | 47.5 | 12 |
| 2.0% | 265 | 58 | 13 |

In a second demonstration of the outstanding viscosity index improving characteristics of the copolymers of the present invention using a 5W base oil the following improvements in viscosity index are obtained.

| | SSU | | Viscosity Index |
|---|---|---|---|
| | 100° F. | 210° F. | |
| Base oil | 92 | 38.5 | 88 |
| Base oil plus 3.6% polymer | 350 | 70.5 | 143 |

Lubricant compositions containing copolymers of the present invention are claimed in our divisional application Serial No. 438,806, filed December 18, 1964.

We claim:
1. The copolymer obtained by polymerizing a polymerizable mixture consisting of (A) from about 90 to about 99.9 mole percent of a $C_{2\text{-}20}$ alkene hydrocarbon monomer having the formula

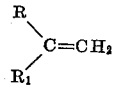

wherein R is hydrogen or methyl and $R_1$ is hydrogen or $C_{1\text{-}17}$ alkyl; (B) from about 0.1 to about 10 mole percent of a monomer selected from the group consisting of unsaturated compounds represented by the following general formulas:

(I)

and (II)

wherein $R_2$ is hydrogen or methyl, $R_3$ is hydrogen, alkyl or aryl, and $R_4$ is alkyl or aryl; and (C) from about 1 to 20 weight percent, based upon the total amount of said monomers A and B, of a cationic polymerization catalyst; under cationic polymerization conditions to form a copolymer of said monomers A and B, said copolymer having a molecular weight of from about 2,000 to about 120,000.

2. The copolymer of claim 1 wherein said catalyst is a Lewis acid.
3. The copolymer of claim 1 wherein said catalyst is boron fluoride.
4. The copolymer of claim 1 wherein monomer A is isobutylene; monomer B is a compound of Formula I wherein $R_2$ and $R_3$ are hydrogen, and $R_4$ is ethyl; and said catalyst is boron fluoride etherate.
5. The copolymer of claim 1 wherein monomer A is isobutylene; monomer B is a compound of Formula I wherein $R_2$ and $R_3$ are methyl, and $R_4$ is ethyl; and said catalyst is boron fluoride.
6. The copolymer of claim 1 wherein monomer A is isobutylene; monomer B is a compound of Formula II wherein $R_4$ is ethyl; and said catalyst is boron fluoride.

(References on following page)

References Cited by the Examiner

UNITED STATES PATENTS

| | | | |
|---|---|---|---|
| 467,430 | 4/1949 | Izard | 260—86.1 |
| 782,167 | 2/1957 | Tutwiler | 252—52 |
| 865,858 | 12/1958 | Holten | 252—52 |
| 996,488 | 8/1961 | Mital et al. | 260—88.1 |
| ,024,225 | 3/1962 | Teot | 260—88.1 |

OTHER REFERENCES

Lal: J. Pol. Sci., 41, pp. 399–402 (1959).

JOSEPH L. SCHOFER, *Primary Examiner.*

JULIUS GREENWALD, *Examiner.*

P. C. BAKER, H. WONG, *Assistant Examiners.*